US005820031A

United States Patent [19]

Reiter et al.

[11] Patent Number: 5,820,031

[45] Date of Patent: Oct. 13, 1998

[54] VALVE NEEDLE FOR AN ELECTROMAGNETICALLY ACTUATED VALVE

[75] Inventors: Ferdinand Reiter, Markgröningen; Martin Maier, Möglingen; Manfred Dreyer, Nürnberg, all of Germany

[73] Assignee: Robert Bosch GmbH, Stuttgart, Germany

[21] Appl. No.: 591,620

[22] PCT Filed: May 26, 1995

[86] PCT No.: PCT/DE95/00692

§ 371 Date: Jul. 1, 1996

§ 102(e) Date: Jul. 1, 1996

[87] PCT Pub. No.: WO95/33923

PCT Pub. Date: Dec. 14, 1995

[30] Foreign Application Priority Data

Jun. 9, 1994 [DE] Germany .......................... 44 20 176.1

[51] Int. Cl.[6] .............................. B05B 1/30; F16K 31/02

[52] U.S. Cl. .................................... 239/585.1; 239/585.4; 239/900; 251/129.21

[58] Field of Search .................................... 239/583, 584, 239/585.1, 585.4, 900; 251/129.21

[56] References Cited

U.S. PATENT DOCUMENTS

| | | | |
|---|---|---|---|
| 2,957,631 | 10/1960 | Armstrong | 239/584 X |
| 4,007,880 | 2/1977 | Hans et al. | 239/585.5 |
| 4,915,350 | 4/1990 | Babitzka et al. | 239/585.4 X |
| 5,072,885 | 12/1991 | Hans et al. | 239/585.4 X |
| 5,307,991 | 5/1994 | Hanson et al. | 251/129.21 X |
| 5,566,920 | 10/1996 | Romann et al. | 239/585.4 |

FOREIGN PATENT DOCUMENTS

| | | | |
|---|---|---|---|
| 3914486 | 11/1990 | Germany . | |
| 4008675 | 9/1991 | Germany . | |
| 4128821 | 3/1993 | Germany . | |
| 4415850 | 11/1995 | Germany . | |
| 4136476 | 5/1992 | Japan | 239/585.4 |

*Primary Examiner*—Andres Kashnikow
*Assistant Examiner*—Robins O. Evans
*Attorney, Agent, or Firm*—Kenyon & Kenyon

[57] ABSTRACT

The valve needle includes a connecting part that is manufactured from a semifinished profiled section and joins an armature and a valve closure member. Together with the armature, the profiled connecting part forms flow channels. Since the fuel flowing through the flow channels arrives downstream from the flow channels, outside of the connecting part and up to the valve seat, there is no need for fuel outside the connecting part. The valve needle is especially suited for injectors in fuel-injection systems of mixture-compressing internal combustion engines with externally supplied ignition.

8 Claims, 3 Drawing Sheets

VALVE NEEDLE FOR AN ELECTROMAGNETICALLY ACTUATED VALVE

FIELD OF THE INVENTION

The present invention relates to a valve needle for an electromagnetically actuated valve.

BACKGROUND INFORMATION

German Patent Application No. 40 08 675 already discloses a valve needle for an electromagnetically actuated valve which is comprised of an armature, a valve-closure member, and a sleeve-shaped connecting pipe joining the armature with the, e.g., spherical valve-closure member. The individual sections represent individual parts which are each manufactured separately and are first joined together by means of jointing methods, e.g. laser welding. The armature in this case completely embraces the connecting pipe radially and axially at least in part, since the connecting pipe is secured in a longitudinal orifice passing right through the armature. The connecting pipe, itself, also has a continuously traversing inner longitudinal orifice, in which the fuel can flow toward the valve-closure member and then flow out near the valve-closure member through radially running, crosswise orifices introduced in the inner wall of the connecting pipe. The fuel first flows inside the valve needle and does not leave the valve needle until close to the valve seat.

SUMMARY OF THE INVENTION

In contrast, the valve needle according to the present invention has the advantage of being able to be produced quite simply and cost-effectively. This is achieved in that the “connecting pipe” no longer has a sleeve shape, but rather is able to be manufactured from a simple and inexpensive semifinished profiled section such as a connecting piece between the armature and the valve-closure member. Thus, all manufacturing processes for longitudinal slits or crosswise orifices in the connecting part are eliminated. The cross-section of the suitable semifinished profiled sections is such that flow channels are automatically formed in the longitudinal orifice of the armature when the armature and connecting part are joined. The relatively large cross-sections of these flow channels are advantageous, as they permit the fuel to flow unhindered through the flow channels in the axial direction and, subsequently, along the outer contour of the connecting part up to the valve-closure member. What is especially advantageous is the use of inexpensive rod stock for the connecting part, which merely has to be dimensioned to an exact length for application on the valve needle.

Particularly advantageous further developments and improvement of the valve needle according to the present invention are semifinished profiled sections to be used as connecting parts for the valve needle which has a cross-shaped or Y-shaped cross section. Together with the four or three profiled arms, the connecting piece used in the longitudinal orifice of the armature also forms, accordingly, four or three flow channels, as one flow channel is created between each two profiled arms in the circumferential direction.

Moreover, it can be advantageous to use semifinished profiled sections having a circular segment-shaped cross-section for the connecting part, particularly when asymmetrical jet characteristics of the medium to be spray-discharged are desired.

DETAILED DESCRIPTION OF THE INVENTION

Figure 1:
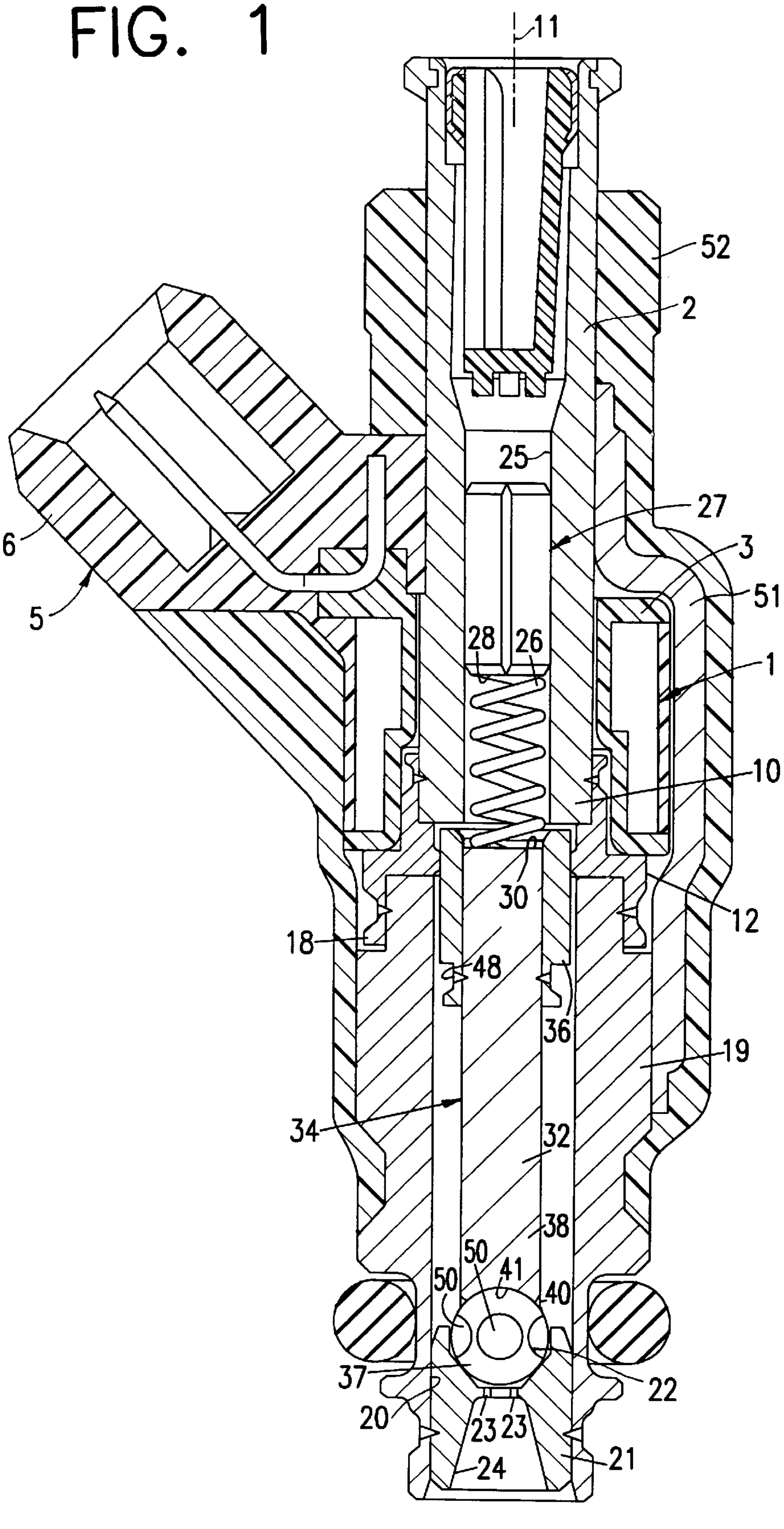
FIG. 1 shows a fuel injector with a valve needle according to the present invention.

The electromagnetically actuated valve depicted as an example in FIG. 1 in the form of an injector for fuel-injection systems of mixture-compressing internal combustion engines with externally supplied ignition has a tubular core 2 which is surrounded by a solenoid coil 1 and is used as a fuel intake connection. The solenoid coil 1 with a coil form 3 is provided, e.g., with a plastic extrusion coat 5, an electrical plug connector 6 being extrusion-coated on at the same time.

A tubular, metallic adapter 12 is imperviously joined, e.g., by means of welding, to a lower core end 10 of the core 2 and partially overlaps the core end 10 axially. At its end facing away from the core 2, the adapter 12 is provided with a lower cylindrical section 18, which overlaps a tubular nozzle support frame 19 and is tightly joined to the same, e.g., by means of welding. A cylindrical valve seat member 21 is imperviously mounted by means of welding in the downstream end of the nozzle support frame 19 in a through-hole 20 running concentrically to the longitudinal valve axis 11. Facing the solenoid coil 1, the valve seat member 21 has a fixed valve seat 22, downstream from which two spray-discharge orifices 23 are formed, e.g., in the valve seat member 21. Downstream from the spray-discharge orifices 23, the valve seat member 21 has a preprocessing borehole 24 that widens frustoconically in the direction of flow.

To adjust the spring resilience of a restoring spring 26, a tubular adjustment bushing 27 is pressed into a graduated flow borehole 25 of the core 2 running concentrically to the longitudinal valve axis 11. The press-in depth of the adjustment bushing 27 in the flow borehole 25 of the core 2 determines the spring resilience of the restoring spring 26 and, thus, also influences the dynamic fuel quantity supplied during the opening and closing valve stroke. With its end facing away from the adjustment bushing 27, the restoring spring 26 is braced against an end face 30 of a connecting part 32 which faces the core 2 and is arranged concentrically to the longitudinal valve axis 11 and designed in accordance with the present invention.

The connecting part 32 produced from a semifinished profiled section is part of a valve needle 34, to which belongs, in addition, a sleeve-shaped armature 36 facing the core 2 and interacting with the core 2 as well as with the solenoid coil 1, and an, e.g., spherical valve-closure member 37 mounted on the downstream end 38 of the connecting part 32. The spherical valve-closure member 37 is securely joined to the connecting part 32, for example, by welded connections 40 produced by means of laser welding. To achieve a best possible connection and an exact centering of the spherical valve-closure member 37 with respect to the connecting part 32, at its downstream end 38 facing away from the end face 30, the connecting part 32 has a front-side, e.g., partially dome-shaped contact surface 41. The connecting part 32 and the valve-closure member 37 have a smaller diameter than the armature 36. On its periphery, the, e.g., spherical valve-closure member 37 has four circular truncated flattened areas 50, which facilitate the fuel flow in the direction of the valve seat 22 of the valve seat member 21. The armature 36 is joined to the end of the connecting part 32 facing away from the valve-closure member 37 and inserted in said armature by several small welding seams 48 and is aligned to the core 2.

The solenoid coil 1 is at least partially surrounded by at least one conductive element 51, which is designed, for example, as a bracket, serves as a ferromagnetic element, and fits with its one end on the core 2 and with its other end on the nozzle support frame 19 and is joined to the same, for example, by means of welding or soldering. A section of the valve is surrounded by a plastic extrusion coating 52, which extends axially from the core 2 by way of the solenoid coil 1 with the plug connector 6 and by way of the at least one conductive element 51.

Figure 2:
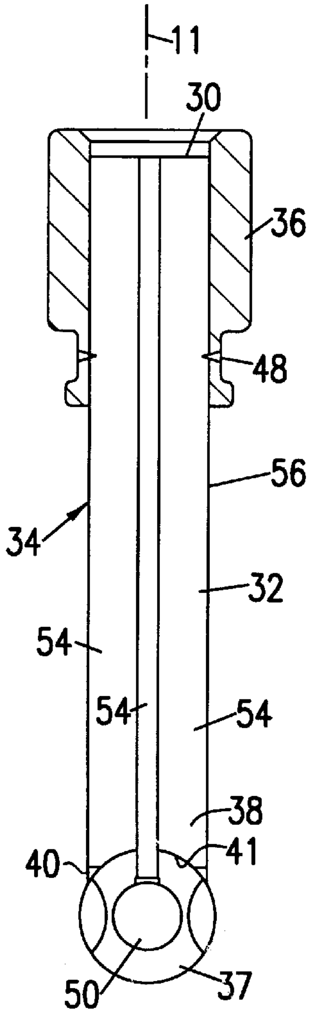
FIG. 2 shows a side view of a valve needle in accordance with a first embodiment of the present invention.
Figure 3:
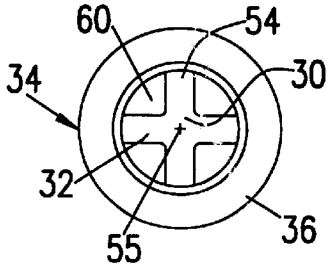
FIG. 3 shows a top view of a valve needle in accordance with the first embodiment of the present invention.

FIG. 2 depicts a side view of a valve needle 34 with a cut-away view of the armature 36 in accordance with a first exemplary embodiment of the present invention, while FIG. 3 shows a top view of this valve needle 34. The connecting part 32 manufactured from a cross-shaped semifinished profiled section has four narrow profiled arms 54, which extend out radially, are offset from one another by 90°, and are joined to one another across a middle region 55. Thus, two profiled arms 54 mutually oppose each other exactly and, in cross-section, form a cross. The profiled arms 54 extend in the longitudinal direction over the entire length of the connecting part 32. The fixed connection of the armature 36 and the connecting part 32 is achieved by the contour of the connecting part 32 in the circumferential direction with welds 48 only where the profiled arms 54 contact the armature 36 from the inside with their rounded-off end surfaces 56. Outside of the profiled arms 54, there is no contacting of the connecting part 32 and the armature 36 in the circumferential direction; rather four axially running flow channels 60 are formed, which are delimited by the inner wall of the armature 36 and, in each case, by two profiled arms 54.

The flow channels 60 have an approximately triangular cross-section because of the form of the connecting part 32 and are exactly as long as the embracing length of the armature 36 around the connecting part 32. The fuel comes from the flow bore 25 in the core 2, arrives at the armature 36, and enters into its inner longitudinal orifice up to the end face 30 of the connecting part 32. Here begin the four flow channels 60, among which the fuel is subdivided and through which it is directed. At the end of the armature 36 facing the valve-closure member 37, fuel emerges again from the flow channels 60 and flows at least partially as a wall film of the connecting part 32 up to the valve-closure member 37. Thus, even without longitudinal slitting or crosswise orifices in the connecting part 32, the fuel flow up to the valve seat 22 is, nevertheless, completely guaranteed. The welded connections 40 between the connecting part 32 and the valve closure member 37 are made, for example, analogously to the welds 48 only in the outer edge area of the profiled arms 54.

Figure 4:
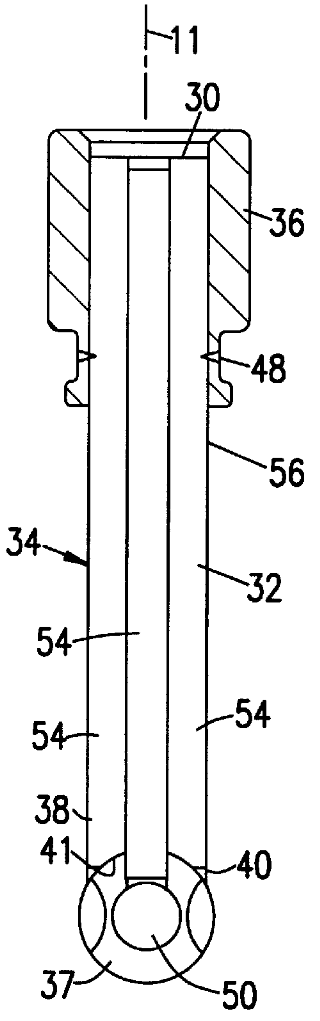
FIG. 4 shows a side view of a valve needle in accordance with a second embodiment of the present invention.
Figure 5:
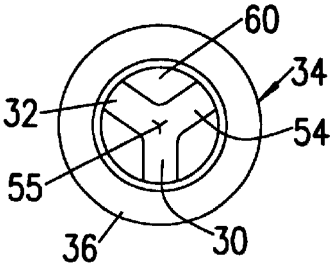
FIG. 5 shows a top view of a valve needle in accordance with the second embodiment of the present invention.

A second exemplary embodiment of a valve needle 34 in accordance with the present invention is shown in a side view and top view, respectively, in FIGS. 4 and 5. The parts that remain the same or have the same action as in FIGS. 1 through 3 are characterized by the same reference numerals. The valve needle 34 is distinguished only by a connecting part 32 having a Y-shaped cross-section. Thus, the connecting part 32 has only three narrow profiled arms 54, which extend out radially, are offset from one another, for example, by 120°, and are joined to one another across a middle region 55. The three profiled arms 54 likewise extend in the longitudinal direction over the entire length of the connecting part 32. The welds 40 and 48 are also provided analogously to the first exemplary embodiment. Of course, the three profiled arms 54 also form three flow channels 60 in the axial extension area of the armature 36 and are traversed axially by the fuel flow. Here, as well, the connecting part 32 represents a very inexpensive variant, since a semifinished profiled section can be used, so that flow channels 60 are already formed without additional fuel outlets having to be provided in various machining steps. Using rod stock for the connecting part 32 is particularly advantageous, as it merely has to be dimensioned to an exact length for application on the valve needle 34.

Figure 6:
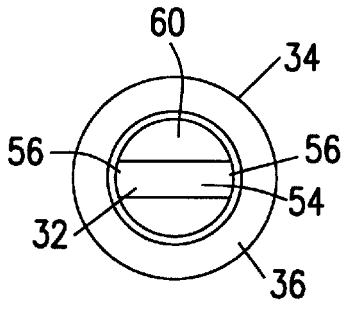
FIG. 6 shows a top view of a valve needle in accordance with a third embodiment of the present invention.

Other exemplary embodiments of valve needles 34 in accordance with the present invention are shown as plan views in FIGS. 6 through 10. The third exemplary embodiment shown in FIG. 6 is a valve needle 34 with a plate-shaped connecting part 32, which has two flat, as well as two rounded-off peripheral areas (end surfaces 56). The two rounded-off end surfaces 56 aid to better secure the connecting part 32 in the armature 36 having the circular inner wall. On the other hand, the flat peripheral areas extend with a radial clearance from the inner wall of the armature 36, so that two flow channels 60 for the fuel are formed between the two flat peripheral areas and the inner wall of the armature 36.

Figure 7:
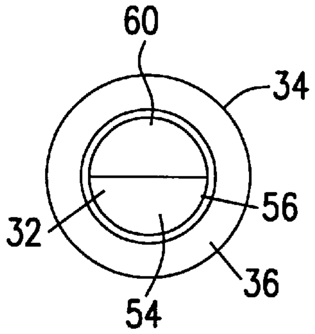
FIG. 7 shows a top view of a valve needle in accordance with a fourth embodiment of the present invention.
Figure 8:
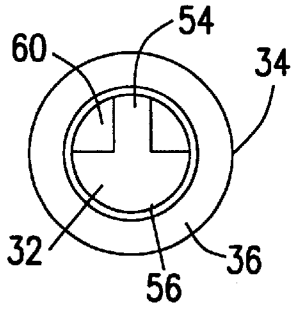
FIG. 8 shows a top view of a valve needle in accordance with a fifth embodiment of the present invention.

The fourth exemplary embodiment depicted in FIG. 7 clarifies another variant of the design of the connecting part 32 from a semifinished profiled section. Here, the connecting part 32 now has a circular-segment-shaped cross-section, to be precise, for example, a semicircular cross-section. The rounded-off end surface 56 contacts the armature 36 at its inner wall and is fixed to the same. The part of the connecting part 32 with a circular-segment-shaped cross-section that is missing from a full circle represents exactly the flow channel 60 inside the armature 36. This flow channel 60 that is formed on one side is especially advantageous when the aim is to achieve asymmetrical jet characteristics. The fifth exemplary embodiment shown in FIG. 8 differs from the fourth exemplary embodiment only in that another profiled arm 54 projects out of the circular-segment-shaped connecting part 32, starting from its flat peripheral area up to the inner wall of the armature 36, and likewise has a rounded-off end surface 56 and, by means of said profiled arm, two flow channels 60 are formed.

Figure 9:
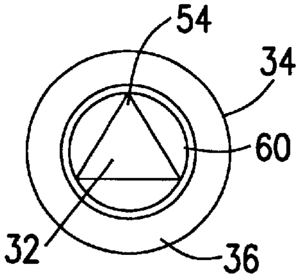
FIG. 9 shows a top view of a valve needle in accordance with a sixth embodiment of the present invention.
Figure 10:
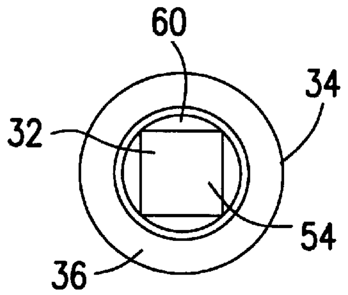
FIG. 10 shows a top view of a valve needle in accordance with a seventh embodiment of the present invention.

FIGS. 9 and 10 illustrate two exemplary embodiments of valve needles 34 with connecting parts 32 which, as semifinished profiled sections, have no rounded-off end surfaces 56. The connecting parts 32 having a triangular or rectangular cross-section have only three or four axial line contacts with the inner wall of the armature 36, so that only very narrow areas are available as securing means between the armature 36 and the connecting part 32. The number of flow channels 60 for the fuel depends on the number of the corners of the connecting part 32, thus when working with a rectangular connecting part 32, there are four flow channels 60. The flow channels 60 are delimited, on the one hand, by the circular inner wall of the armature 36 and, on the other hand, by the flat peripheral areas of the connecting part 32 running between two corners. These connecting parts 32 make it possible to form flow channels 60 of either the same size or, also, of different sizes.

What is claimed is:

1. A valve needle for an electromagnetically actuated valve for a fuel-injection system of a combustion engine, the valve having a core, a solenoid coil, and a fixed valve seat, the valve needle comprising:

an armature;

a valve closure member; and a connecting part connecting the armature to the valve closure member, the connecting part being at least partially radially surrounded by the armature, and having a longitudinal axis and a length, the connecting part further having at least one radially extending profiled arm, at least one flow channel being formed between the armature and the connecting part, the at least one radially extending profiled arm also extending in a direction of the longitudinal axis for substantially the length of the connecting part.

2. The valve needle according to claim 1, wherein the connecting part has a cross-shaped cross-section having four radially outwardly extending profiled arms.

3. The valve needle according to claim 1, wherein the connecting part has a Y-shaped cross-section having three profiled arms extending radially outward.

4. The valve needle according to claim 1, wherein the connecting part has a circular segment-shaped cross-section having at least one profiled arm.

5. The valve needle according to claim 1, wherein the connecting part has a polygonal cross-section, the number of flow channels formed being equal to a number of corners of the polygon.

6. The valve needle according to claim 2, wherein four flow channels are formed by the armature and the connecting part having the cross-shaped cross-section.

7. The valve needle according to claim 3, wherein three flow channels are formed by the armature and the connecting part having the Y-shaped cross-section.

8. A valve needle for an electromagnetically actuated valve for a fuel-injection system of a combustion engine, the valve having a core, a solenoid coil, and a fixed valve seat, the valve needle comprising:

an armature;

a valve closure member; and a connecting part connecting the armature to the valve closure member, the connecting part being manufactured from a semifinished profiled section, being at least partially radially surrounded by the armature, and having at least one radially extending profiled arm, at least one flow channel being formed between the armature and the connecting part;

wherein the valve closure member is spherical, and an end of the connecting part facing the valve closure member has a dome-shaped contact surface.

* * * * *